Feb. 10, 1970        L. F. URRY        3,494,802
DRY CELL WITH NOVEL VENTING MEANS
Filed Feb. 19, 1968

INVENTOR
LEWIS F. URRY
BY
ATTORNEY

United States Patent Office 3,494,802
Patented Feb. 10, 1970

3,494,802
DRY CELL WITH NOVEL VENTING MEANS
Lewis F. Urry, North Olmsted, Ohio, assignor to Union Carbide Corporation, a corporation of New York
Filed Feb. 19, 1968, Ser. No. 706,309
Int. Cl. H01m 1/06, 1/02
U.S. Cl. 136—178                                    4 Claims

ABSTRACT OF THE DISCLOSURE

A dry cell employing a cylindrical cupped container having an open end sealed by an annular closure disc surrounding a central cathode rod is provided with a novel vent valve comprising a flat annular seal gasket overlying a venting aperture formed within the closure disc and biased into normally sealing relation around the venting aperture by the flanged lower edge portion of a flanged metal terminal cap mounted on top of the cathode rod. Upon the development of a predetermined gas pressure within the cell, the flanged edge portion of the terminal cap is deflectable in a direction away from the flat annular seal gasket momentarily breaking the seal around the venting aperture and allowing gas to escape from inside the cell.

---

This invention relates to dry cells and especially dry cells employing a magnesium anode, and more specifically concerns the provision of novel venting means for releasing gas pressure developed during discharge of such cells.

Magnesium dry cells are ideally suited for use as the power source in many applications where a high working voltage is required. As compared to the conventional Leclanché dry cell with a zinc anode, magnesium cells operate at a voltage of about 0.3 volt higher under conditions of equivalent current drain. Despite this rather significant advantage, magnesium cells have not yet attained widespread use primarily because they have been plagued by many difficulties.

One of the most serious difficulties encountered with magnesium cells is that of gas generation and possible build-up of dangerous gas pressure during discharge of the cells. This is due to the rather poor efficiency of the active magnesium anode which reacts wastefully with water in the electrolyte to produce hydrogen gas in copious quantities.

In the past, Leclanché dry cells have employed venting means for releasing gas pressure developed within the cell. Usually this venting means has consisted of an open diffusion vent of one type or another formed within the cell closure. While this type of venting means may be satisfactory for a Leclanché dry cell, it is by no means suitable for use in a magnesium cell since an open diffusion vent is not capable of rapidly releasing large quantities of gas from inside the cell. A magnesium cell generally will produce gas on normal discharge at a rate of up to one thousand times faster than a Leclanché dry cell which does not generate gas in serious quantities until the cell has been completely discharged.

Another disadvantage of an open diffusion type vent as used in prior Leclanché dry cells is that it too readily permits the continued loss of moisture from the cell. For extended shelf life, a magnesium cell must be capable of retaining substantially all of its initial water content and consequently the cell is required to be hermetically sealed during the period of shelf storage.

Still another disadvantage of such prior diffusion type vents is that they are open at all times during discharge as well as when the cell is on shelf. Ideally, venting means for a magnesium cell should be capable of maintaining the cell in a sealed condition during shelf storage and then rapidly releasing copious quantities of gas generated when the cell is discharged. In addition, the venting means should be capable of resealing itself once the gas pressure has been released. Moreover, the venting means used must be simple in construction and inexpensive to manufacture.

It is therefore an important object of this invention to provide a novel and improved venting means for a dry cell.

A more specific object of this invention is to provide a novel and improved venting means for a magnesium cell which will maintain the cell in a sealed condition during the time that the cell is on shelf storage but which is capable of rapidly releasing gas pressure from inside the cell when copious quantities of gas are generated.

Another object of this invention is to provide such a novel and improved venting means which is capable of resealing itself once the gas pressure has been released.

Still another object of this invention is to provide such a novel and improved venting means which is simple in construction, inexpensive to manufacture and which is constructed from parts forming the sealed closure of the cell.

The foregoing and other objects are accomplished in accordance with the invention by the provision in a dry cell employing a cylindrical cupped container having an open end sealed by an annular closure disc surrounding a central cathode rod of a novel valve vent comprising a flat annular seal gasket fitted around the cathode rod and overlying a venting aperture formed within the closure disc, the flat annular seal gasket being biased into normally sealing relation around the venting aperture by the flanged lower edge portion of a flanged metal terminal cap mounted on top of the cathode rod.

Reference will now be made in the ensuing specification to the accompanying drawing which shows specific embodiments of the invention, and wherein.

Figure 1:
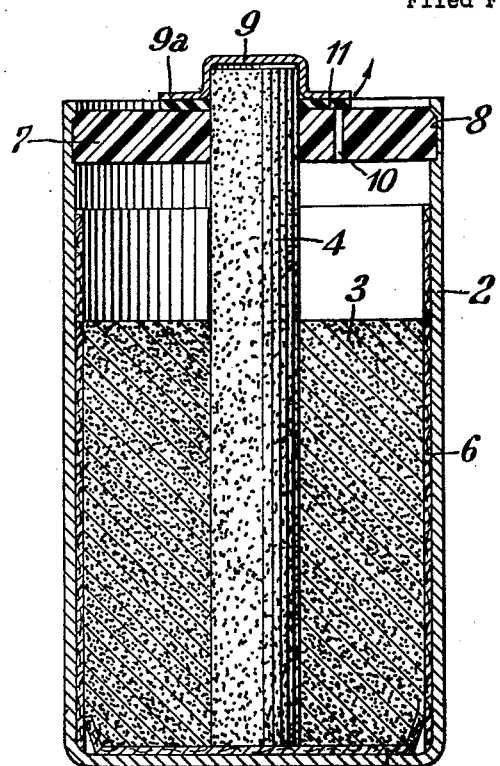
FIGURE 1 is an elevational view in section of a dry cell embodying the novel valve vent of the invention.
Figure 2:
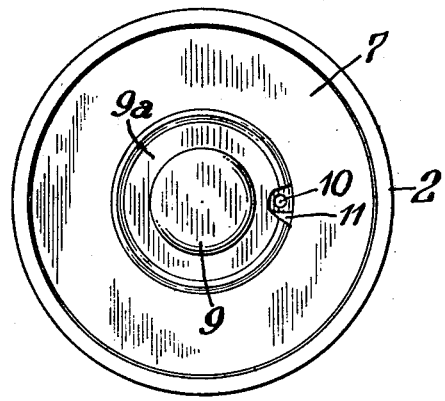
FIGURE 2 is a top plan view of the dry cell shown in FIGURE 1.

Referring to FIGURES 1 and 2, there is shown a dry cell embodying the invention. As denoted by the reference numeral 2, the cell includes a cylindrical cupped container of a consumable magnesium metal or alloy which serves as the anode of the cell. Within this container-anode 2 there is disposed the usual cathode bobbin consisting of a manganese dioxide depolarizer mixture 3 and a central carbon cathode rod 4. The cathode rod 4 is embedded within the depolarizer mixture 3 and extends at its top end beyond the upper peripheral edges of the container-anode 2. A star washer 5 is placed at the bottom of the cathode bobbin and insulates the depolarizer mixture 3 and the cathode rod 4 from the bottom end of the container-anode 2. An ion permeable separator in the form of a bibulous paper sleeve 6 surrounds the cathode bobbin between the depolarizer mixture 3 and the side wall of the container-anode 2. The separator may consist of a methyl cellulose coated paper, for example.

The closure for the cell is provided in the form of an insulating annular disc 7 suitably of a plastic material, which is tightly fitted around the upper end portion of the cathode rod 4 within the open end of the container-anode 2. The insulating annular disc 7 is made slightly larger than the inside diameter of the container-anode 2 and is forced through its open end into locked engagement with a peripheral groove 8 provided on the upper interior side wall of the anode 2. The resilient forces exerted by the side wall of the container-anode 2 when the insulating disc 7 is forced through its open end form a tight radial seal between the outer peripheral edges of the disc 7 and the interior side wall of the container-anode 2. A flanged metal terminal cap 9 is fitted tightly over the top of the cathode rod 4 which protrudes through the central opening in the disc 7 and serves as the positive terminal of the cell.

The valve vent in accordance with the invention is formed by the provision in the insulating annular disc 7 of a venting aperture 10 located beneath the terminal cap 9. A flat annular seal gasket 11 is positioned on top of the insulating disc 7 around the cathode rod 4 and overlies the venting aperture 10 at a point near its outer peripheral edge. The seal gasket 11 may be made from any suitable gasket material such as rubber or neoprene or the like.

As best shown in FIGURE 1, the terminal cap 9 is formed integrally with a flanged lower edge portion 9a which is mounted directly on top of the flat annular seal gasket 11. The flanged edge portion 9a is positioned at its outermost or free end in resilient pressure contact with that part of the flat seal gasket 11 overlying the venting aperture 10. It will be seen that the flanged edge portion 9a of the terminal cap 9 constitutes in effect a resilient gasket retainer member which biases the flat annular seal gasket 11 into normally sealing relation around the venting aperture 10 but which at the same time is deflectable at its outermost end in a direction away from the flat seal gasket 11 as generally indicated by the arrow in the drawing.

During the time that the cell is on shelf storage or on initial discharge when little if any gas is generated, the valve vent is maintained in a normally closed position and there is substantially little if any loss of moisture from the cell. However, when the cell is discharged, there may be generated copious quantities of gas which can give rise to the build-up of an excessive or unsafe internal gas pressure inside the cell. When this predetermined gas pressure is reached, the flanged lower edge portion 9a of the terminal cap 9 is caused to deflect at its outermost end in a direction away from the flat annular seal gasket 11 by the force of the gas pressure applied through the venting aperture 10. With this deflection of the flanged edge portion 9a, the seal formed around the venting aperture 10 is momentarily broken allowing gas to escape from the cell. Once the gas pressure has been released, the flanged edge portion 9a of the terminal cap 9 returns to its initial biasing position over the top of the flat seal gasket 11, thus resealing the valve vent.

Figure 3:
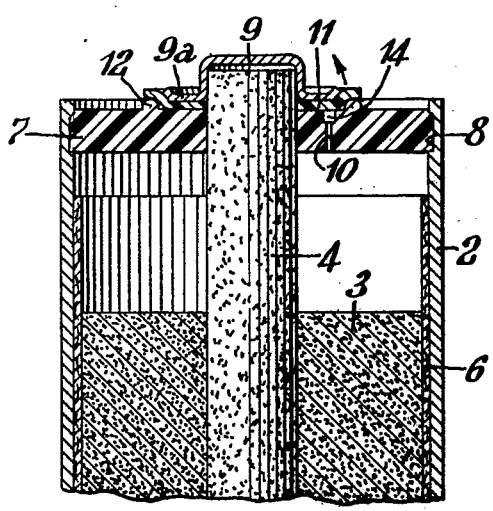
FIGURE 3 is a sectional view of the top portion only of a dry cell showing a modification of the valve vent of the invention.

FIGURE 3 shows a modification of the valve vent wherein an annular round embossment 12 is formed on the insulating disc 7 just below the outer peripheral edges of the flat annular seal gasket 11. It will be seen that by this modification the outer periphery of the flat seal gasket 11 is forced into tight sealing relation with the annular embossment 12, thus assuring a good seal around the venting aperture 10 for prohibiting moisture loss during the time that the valve vent is closed on shelf storage.

Figure 4:
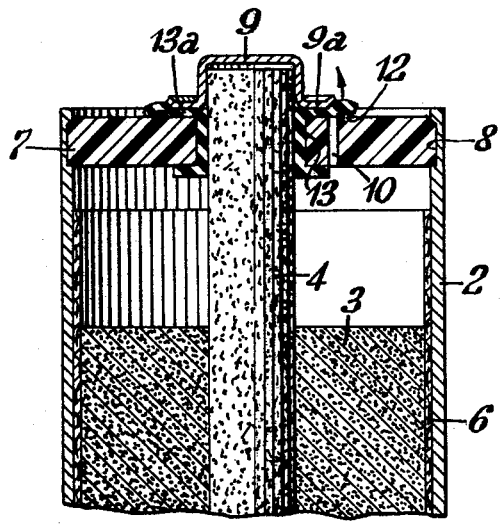
FIGURE 4 is a similar view of a dry cell showing another modification of the invention.

Another modification of the valve vent is shown in FIGURE 4. Here the valve vent employs a flat annular seal gasket 13a which is formed integrally with an annular grommet 13 fitted within the central opening in the insulating disc 7. The grommet 13 forms a tight seal between the disc and the cathode rod 4 which further aids in prohibiting moisture loss from the cell.

The valve vent may be designed to open and vent gas from inside the cell at any given predetermined pressure by varying the effective area of gas contact on the underneath side of the flat annular seal gasket 11. Thus, the valve vent may be made to open at lower pressures by increasing the size or diameter of the venting aperture 10. However, this may be undesirable in some cases and especially with smaller cells such as A size cells since the larger venting aperture tends to weaken the insulating disc 7. One way to avoid this problem is to increase the area of gas contact on the flat seal gasket 11 by providing the venting aperture 10 with an enlarged opening or recess 14 on the top surface of the disc 7 as shown in FIGURE 3.

The present invention thus provides a novel valve vent which will maintain the cell in a sealed condition while on shelf storage but which is capable of rapidly releasing copious quantities of gas on discharge. The valve vent is also constructed from parts normally used to form the sealed closure for the cell.

What is claimed is:
1. In a dry cell, the combination of:
   (a) a cylindrical cupped container having an open end;
   (b) a central cathode rod protruding through the open end of said container and beyond the peripheral edges thereof;
   (c) an annular closure disc mounted within the open end of said container and surrounding said cathode rod, said closure disc having a venting aperture therein;
   (d) a flat annular seal gasket fitted around said cathode rod and overlying said venting aperture; and
   (e) a flanged metal terminal cap mounted over the protruding end of said cathode rod and having a flanged lower edge portion disposed over said flat annular seal gasket biasing said seal gasket in normally sealing relation around said aperture but being deflectable in a direction away from said seal gasket upon the development of a predetermined gas pressure within said cell.

2. The dry cell as defined by claim 1 wherein the closure disc is formed with an annular embossment just below the outer peripheral edges of said flat annular seal gasket.

3. The dry cell as defined by claim 1 wherein the venting aperture is formed with an enlarged opening on the outer surface of said closure disc.

4. The dry cell as defined by claim 1 wherein the flat annular seal gasket is formed integrally with an annular grommet mounted within the central opening of said closure disc around said cathode rod.

References Cited

UNITED STATES PATENTS 2,060,799 11/1936 Drummond _____ 136—133
2,322,210 6/1943 Adams _____ 136—100

WINSTON A. DOUGLAS, Primary Examiner

D. L. WALTON, Assistant Examiner

U.S. Cl. X.R.

136—133